(12) United States Patent
Okamoto

(10) Patent No.: US 6,794,072 B2
(45) Date of Patent: Sep. 21, 2004

(54) FUEL CELL SYSTEM

(75) Inventor: Masaru Okamoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 267 days.

(21) Appl. No.: 10/152,723

(22) Filed: May 23, 2002

(65) Prior Publication Data
US 2002/0177016 A1 Nov. 28, 2002

(30) Foreign Application Priority Data
May 25, 2001 (JP) ........................................ 2001-157037

(51) Int. Cl.$^7$ .............................................. H01M 8/04
(52) U.S. Cl. ............................. 429/24; 429/17; 429/20; 429/22; 429/23; 429/25
(58) Field of Search .......................... 429/20, 17, 22, 429/23, 24, 25

(56) References Cited

U.S. PATENT DOCUMENTS 6,582,841 B2 * 6/2003 Okamoto et al. ............. 429/13

2001/0016274 A1 * 8/2001 Kawasumi et al. ........... 429/20

FOREIGN PATENT DOCUMENTS

EP 1160902 A2 * 12/2001
JP 2000-178001 6/2000

* cited by examiner

Primary Examiner—John S. Maples
(74) Attorney, Agent, or Firm—McDermott Will & Emery LLP

(57) ABSTRACT

A fuel cell system is provided which controls the temperature while maintaining the internal pressure of the fuel cell system to a permitted pressure range. A target variation amount in the flow rate of the anode effluent is calculated based on a single target temperature-time curve selected from a plurality of target temperature-time curves. Furthermore the pressure variation of the reformate gas produced by variation in the target flow rate is predicted. It is determined whether the predicted pressure will be maintained to a permitted temperature range. When the predicted pressure will not be maintained to the permitted temperature range, a temperature-time curve with more gentle variation is selected. A final curve is selected by repeating the selection process until it is determined that the predicted pressure will be maintained to the permitted temperature range.

11 Claims, 7 Drawing Sheets

FUEL CELL SYSTEM

FIELD OF THE INVENTION

This invention relates to a fuel cell system.

BACKGROUND OF THE INVENTION

One type of a reformer for use in a fuel cell system uses a mixture of water and a liquid hydrocarbon such as methanol as an unreformed fuel. In this type of reformer, oxygen in air and the gaseous mixture of water and vaporized hydrocarbon are reacted in the presence of a reforming catalyst in order to produce a reformate gas (power-generating fuel gas) mainly comprising hydrogen. Both partial oxygenation reactions and water vapor reformate reactions are promoted in the reformer.

In a fuel cell system having the above type of reformer, it is necessary to vaporize the unreformed liquid fuel containing water and hydrocarbon. A vaporizer for vaporizing unreformed liquid fuel and a combustor supplying an amount of heat required for vaporization are provided for this purpose. The fuel in the combustor comprises air acting as an oxidizing agent and a hydrogen contained in anode effluent of the reformate gas which is not used in power generation in the fuel cell stack. The combustor is operated at a target operating temperature. Hence, it is necessary to regulate the flow rate of air and the flow rate of anode effluent in order to maintain the temperature of the combustor to a target operating temperature.

Furthermore the vaporizer is also operated at a target operating temperature in order to ensure vaporization of the unreformed fuel. The temperature of the vaporizer varies when the amount of unreformed fuel introduced into the vaporizer is varied. For example, when the flow rate of unreformed fuel introduced into the vaporizer undergoes a sharp increase as a result of a large increase in the required amount of power generation, the temperature of the vaporizer undergoes a sharp decrease and deviates from a target vaporizer temperature which corresponds to the required power generation amount. In some cases, the vaporizer temperature deviates from the permitted range of temperature bounded by upper and lower limiting temperatures.

Thus it is necessary to regulate the amount of combustion in the combustor so that an amount of heat canceling out this type of temperature variation is supplied from the combustor. Consequently the flow rate of anode effluent comprising hydrogen for the combustor is regulated on the basis of the amount of unreformed fuel introduced into the vaporizer. The control of this type of fuel cell system is disclosed in Tokkai Hei 2000-178001 published by the Japanese Patent Office in 2000.

This conventional technique introduces anode effluent which was not used in the fuel cell stack into the combustor through a return pipe which is connected to the inlet of the combustor and the discharge gas outlet of the fuel cell stack. Control of the temperature of the combustor is performed by regulating the amount of a liquid hydrocarbon, for example, when the amount of anode effluent is insufficient and the temperature of the combustor is not sufficiently high.

SUMMARY OF THE INVENTION

However in this conventional technique, the flow rate of anode effluent undergoes large fluctuations in an extremely short time period when it is attempted to immediately restore the temperature or when a temperature abnormality is detected. Furthermore variation in the internal pressure of the system is not taken into account when the flow rate regulation valve for anode effluent is opened and closed in rapid succession in order to control the temperature of the vaporizer or the combustor.

As a result, the pressure differential between the anode and the cathode in the fuel cell stack may exceed the permitted range of pressure. In this case, components other than the fuel cell stack, for example the reformer, may be damaged.

It is therefore an object of this invention to provide a fuel cell system which controls the temperature of a vaporizer or a combustor while maintaining the internal pressure of the fuel cell system to a permitted range of pressure.

In order to achieve above object, this invention provides a fuel cell system comprising: a vaporizer for vaporizing liquid unreformed fuel in order to produce an unreformed fuel gas; a reformer which reforms the unreformed fuel gas in order to produce a reformate fuel gas; a fuel cell stack which generates power using the reformate fuel gas; a combustor which produces energy by combusting combustible components in a discharge gas supplied to the combustor from the fuel cell stack, the combustor applying energy for producing the unreformed fuel gas to the vaporizer; and a programmable controller.

The programmable controller functions to control at least one of temperatures of the vaporizer and the combustor to their respective permitted temperature ranges, by varying the flow rate of the discharge gas to the combustor.

The controller sets a target variation over time for the flow rate, predicts the pressure of the reformate fuel gas based on the target variation over time for the flow rate, and changes the target variation over time for the flow rate when the predicted pressure for the reformate fuel gas deviates from a permitted pressure range.

The details as well as other features and advantages of this invention are set forth in the remainder of the specification and are shown in the accompanying drawings.

DESCRIPTION OF THE PREFERRED EMBODIMENTS

The preferred embodiments of a fuel cell system as defined by this invention will be described as applied to a vehicle. However the application of this invention is not limited in application to vehicles.

Figure 1:
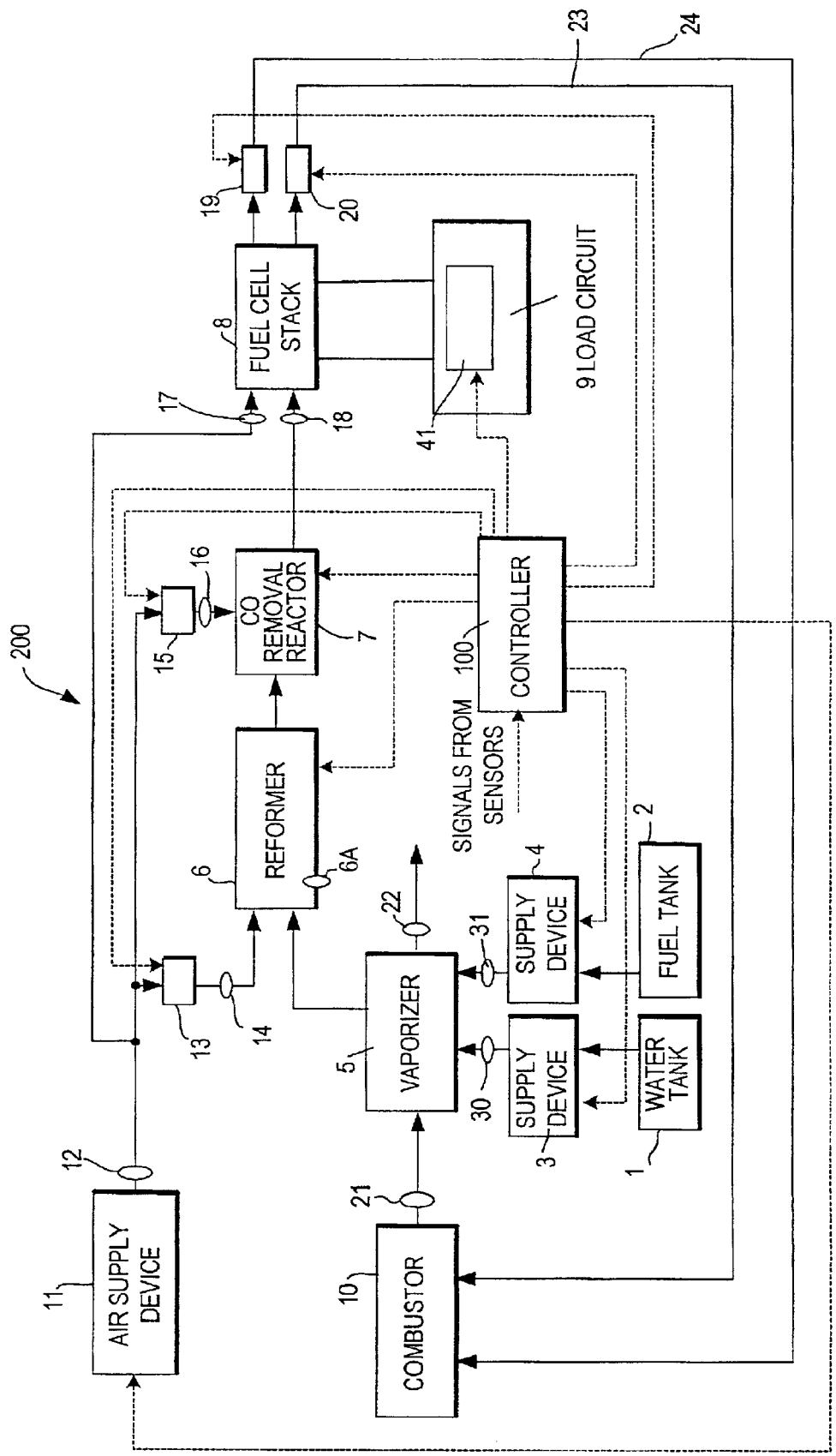
FIG. 1 is a schematic diagram of a fuel cell system.
Figure 2:
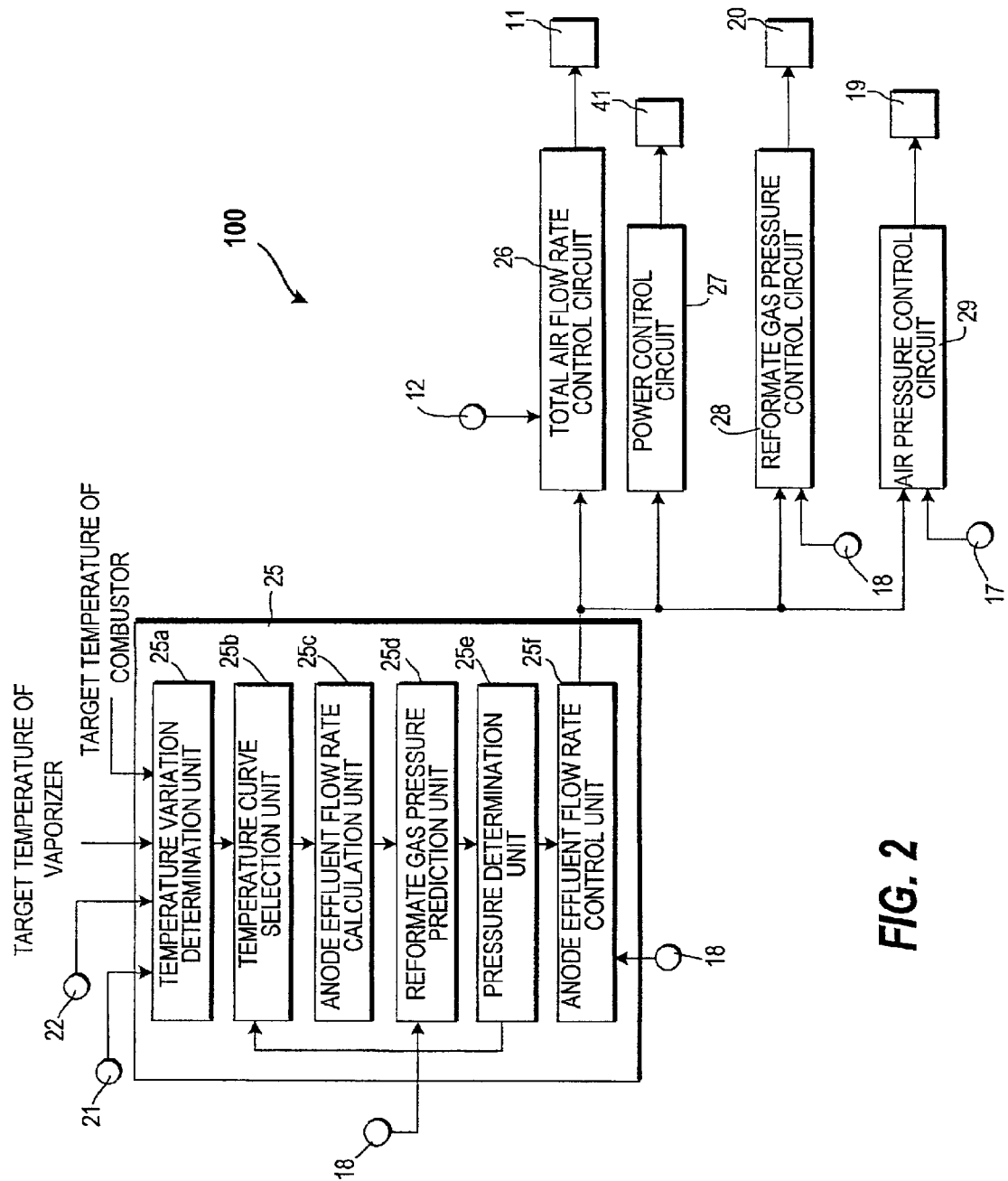
FIG. 2 is a block diagram showing the structure of a controller according to this invention.

This embodiment is related to a fuel cell system which controls the temperatures of a vaporizer and combustor to their respective permitted temperature ranges, and which ensures a suitable internal pressure in the fuel cell system. FIG. 1 is a schematic figure of a fuel cell system according to this embodiment. FIG. 2 is a block diagram showing an example of the structure of a controller 100. The programmable controller 100 is provided with a microcomputer 25 comprising a central processing unit (CPU), a random access memory (RAM), a read-only memory (ROM) and an input/output interface. The broken line in FIG. 1 shows the signal route of the control system. The controller 100 is operated in response to a control routine (program) stored in the ROM of the microcomputer 25. The microcomputer 25 is provided with processor units 25a–25f as shown in FIG. 2. These units are virtual units constructed from the functions of the CPU, ROM and RAM.

The fuel cell system as shown in FIG. 1 generates power using a hydrocarbon stored in the unreformed hydrocarbon fuel tank 2 and water from the water tank 1. It is preferred that the hydrocarbon is methanol. Water and hydrocarbon are introduced into the vaporizer 5 through the supply devices 3 and 4 having their respective injectors. In the vaporizer 5, the unreformed liquid fuel is vaporized by the heat supplied from the combustor 10. The combustor 10 generates the required heat for vaporizing, using air and hydrogen discharged from the fuel cell stack 8 which is described hereafter.

Unreformed fuel vapor from the vaporizer 5 is transferred to the reformer 6. The unreformed fuel vapor is reacted with oxygen in the air supplied to the reformer 6 from a compressor in the air supply device 11. This promotes water vapor reformate reactions and partial oxygenation reactions. In this manner, a hydrogen-rich reformate gas (power generation fuel gas) is produced. A flow rate sensor 14 and a flow rate control valve 13 are mounted along the pipe supplying air to the reformer 6. The flow rate of air supplied to the reformer 6 is controlled by regulating the aperture of the flow rate control valve 13 with a temperature control circuit (not shown) in the controller 100. Consequently control is performed by the controller 100 on the basis of output signals from the temperature sensor 6a mounted in the reformer 6 so that the temperature of the reformer 6 coincides with a target set temperature.

Carbon monoxide (CO) is contained in the hydrogen-rich reformate gas transferred from the reformer 6. A CO removal reactor 7 is provided in order to protect the electrodes of the fuel cell stack 8 from toxicity by removing CO components by combustion.

A required flow rate of air is supplied from the air supply device 11 to the CO removal reactor 7 by regulating the aperture of the air flow rate control valve 15 with the controller 100. CO is removed by combustion through oxidation reactions between CO in the reformate gas and oxygen in the air. Although this is not shown in the figures, cooling water is passed through the CO removal reactor 7 in order to maintain the temperature of the CO removal reactor 7 to a suitable temperature by controlling the flow rate of cooling water with the controller 100.

The hydrogen-rich reformate gas transferred from the CO removal reactor 7 is introduced to the anode of the fuel cell stack 8. Air is supplied from the air supply device 11 to the cathode of the fuel cell stack 8. Power generation is performed using the reactions between the oxygen in the air and the hydrogen-rich reformate gas.

The overall mechanism of air supply will be described below. The example shown in FIG. 1 comprises a single air supply device 11 which supplies air required by the overall fuel cell system. The supply targets for air from the air supply device 11 comprise the three pathways to the reformer 6, the CO removal reactor 7 and the cathode of the fuel cell stack 8 (including the combustor 10). The total amount of discharge flow from the compressor of the air supply device 11 is measured by a flow rate sensor 12. As described above, the flow rate of air supplied to the CO removal reactor 7 and the reformer 6 are respectively measured by the flow rate sensor 14 and the flow rate sensor 16.

The controller 100 performs branching supply of a required flow rate of air to the reformer 6 and the CO removal reactor 7 by independent control of the aperture of the flow rate control valve 13 and the flow rate control valve 15. The microcomputer 25 of the controller 100 outputs commands to the total air flow rate control circuit 26 in order to regulate the rotation speed of the compressor of the air supply device 11 so that the total air flow rate required by the reformer 6, the CO removal reactor 7 and the fuel cell stack 8 (combustor 10) is equal to the measured value from the flow rate sensor 12. Consequently the flow rate of air supplied to the fuel cell stack 8 (combustor 10) corresponds to the required amount for the fuel cell stack 8 (combustor 10).

Air and reformate gas which have not been used in power generation are discharged from the fuel cell stack 8. Air which has not used in power generation is hereafter referred to as "cathode effluent". Discharged reformate gas (discharge gas) is hereafter referred to as "anode effluent". A pressure regulation valve 19 is mounted in the piping for the cathode effluent and a pressure regulation valve 20 is mounted in the piping for the anode effluent. The microcomputer 25 detects the pressure of the air and the reformate gas using a pressure sensor 17 and a pressure sensor 18, respectively. The microcomputer 25 performs independent regulation of the aperture of the pressure regulation valve 19 and the pressure regulation valve 20 by outputting respective command signals to the air pressure control circuit 29 and the reformate gas pressure control circuit 28 as shown in FIG. 2. In this manner, a control is performed so that the pressure at the anode and the cathode of the fuel cell stack 8 coincide to respective target pressures. As described above, this embodiment uses a structure of supplying a required amount of air to the overall fuel cell system using a single air supply device 11. Thus the pressure at the cathode of the fuel cell system coincides with the pressure in the air passage route in the entire fuel cell system.

Cathode effluent and anode effluent from the fuel cell stack 8 are supplied respectively by piping 24 and piping 23 to the combustor 10. As described above, anode effluent from the piping 23 is combusted in the combustor 10 using oxygen in the cathode effluent from the piping 24. Consequently the total air flow rate control circuit 26 in the controller 100 regulates the air amount from the air supply device 11 using an air fuel ratio (A/F ratio) so that the flow rate of oxygen in the cathode effluent is commensurate with the flow rate of anode effluent. Combustion in the combustor 10 allows supply of a required amount of heat to the vaporizer 5 in order to vaporize the unreformed fuel. The controller 100 determines whether or not vaporizing operations are progressing suitably in the vaporizer 5 based on whether or not the temperature measured by a temperature sensor 22 in the exhaust passage of the vaporizer 5 has reached a target temperature. In the same manner, the controller 100 determines whether or not the temperature of the combustor 10 has reached the target temperature using a temperature sensor 21 mounted in the outlet of the combustor 10.

The amount per unit time of anode effluent supplied to the combustor 10 can be determined based on the target temperature of the combustor 10 determined in response to the target temperature of the vaporizer 5 and the flow rate of unreformed fuel introduced into the vaporizer 5. The target supply amount of water to the vaporizer 5 and the target supply amount of hydrocarbon to the vaporizer 5 is calculated by the controller 100 based on the power generation amount required by the fuel cell stack 8. The flow rate of water discharged by the supply device 3 is inputted to the controller 100 by a flow rate sensor 30. The flow rate of hydrocarbon discharged by the supply device 4 is inputted to the controller 100 by a flow rate sensor 31. The control circuit (not shown) provided in the controller 100 controls the supply device 4 and the supply device 3 so that the flow rates respectively correspond to a respectively target values.

A required power of the fuel cell stack 8 is calculated based on the depression amount of the accelerator pedal by the driver. A load circuit 9 comprising a battery and a power conversion circuit 41 such as an inverter is connected to the fuel cell stack 8. Power from the fuel cell stack 8 is supplied to the load circuit 9 and can be used as a drive force for running the vehicle. In this embodiment, the power generation of the fuel cell stack 8 is controlled via the power conversion circuit 41 by the command signals from the power control circuit 27 in response to the power required by the load components of the load circuit 9. That is to say, the power consumed by the load circuit 9 is controlled by commands from the microcomputer 25 in the controller 100 via the power control circuit 27 as shown in FIG. 2, and the power generation amount in the fuel cell stack 8 is regulated so as to correspond to the power consumption amount.

The supply amount of unreformed fuel (water and carbohydrate) is determined so that a power generation amount which is set as shown above is realized. A target temperature for the combustor 10 is determined so that the supplied amount of unreformed fuel can be sufficiently vaporized. The flow rate (supply amount) of anode effluent to the combustor 10 is determined in response to the target temperature. In this manner, the temperature of the combustor 10, the flow rate of anode effluent to realize this temperature and the supply amount of unreformed fuel to the vaporizer 5 are determined in response to the required power generation amount.

When the temperature of the vaporizer 5 or the combustor 10 falls from the target value, it is necessary to immediately increase the flow rate of anode effluent introduced into the combustor 10 in a short period of time. The structure shown in FIG. 2 allows the pressure in the route along which reformate gas flows to be controlled by a reformate gas pressure control circuit 28. In this case, the flow rate of anode effluent is varied as an external disturbance in order to control the temperature of the combustor 10 and the vaporizer 5. Thus the pressure of the passage through which the reformate gas flows fluctuates. Since the variation in the flow rate of anode effluent results in variation in the internal pressure of the fuel cell system, it becomes necessary to suitably control the variation in the flow rate of the anode effluent in order to protect the fuel cell system. Specific control for the fuel cell system in this embodiment which is performed by the controller 100 will be described hereafter.

Figure 3A:
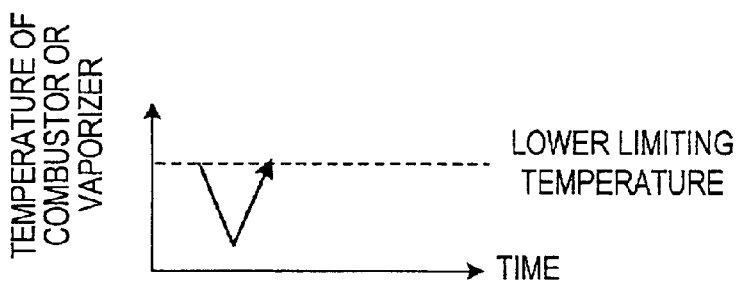
FIG. 3 is a schematic figure showing an example of variation in the pressure of the reformate gas and corresponding variation in the flow rate in the anode effluent in the conventional technique.
Figure 3B:
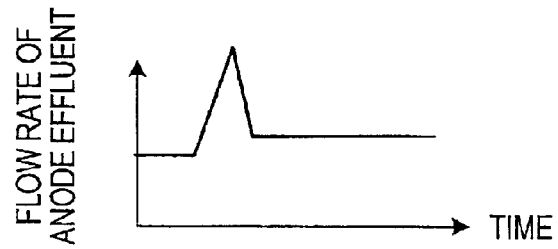
Figure 3C:
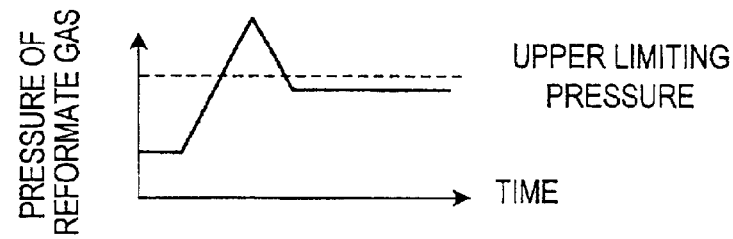

FIG. 3 is a schematic view showing a conventional control technique to return the temperature of the combustor 10 and the vaporizer 5. More precisely, FIG. 3A shows variation over time in the temperature of the combustor or the vaporizer, FIG. 3B shows variation over time in the flow rate of the anode effluent and FIG. 3C shows variation over time in the pressure of the reformate gas. FIG. 3A shows a conventional control technique for immediately returning a temperature which has fallen to below a lower limiting temperature. The situation is assumed in which the flow rate of the anode effluent is increased by reducing the power generation amount of the fuel cell stack 8 in FIG. 1. When the flow rate of anode effluent to the combustor 10 is increased at once as shown in FIG. 3B by reducing the power generation amount, it may be the case that the pressure of reformate gas exceeds the upper limiting presure as shown in FIG. 3C.

In the example of a conventional technique as shown in FIG. 3, variation in the flow rate of anode effluent is performed by controlling the power generation amount of the fuel cell stack 8. Thus the variation over time in the pressure of the reformate gas is Bell-shaped as shown in FIG. 3C and it is sometimes the case that the pressure peak of the reformate gas exceeds the upper limiting value. On the other hand, when the flow rate of anode effluent is increased by increasing the aperture of the pressure control valve 20, the pressure of reformate gas takes the form of an inverted Bell-shaped curve and may take values less than the lower limiting value.

Figure 4A:
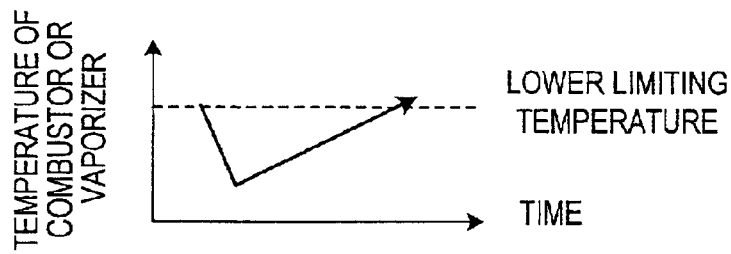
FIG. 4 is a schematic figure showing an example of variation in the pressure of the reformate gas and corresponding variation in the flow rate in the anode effluent in this invention.
Figure 4B:
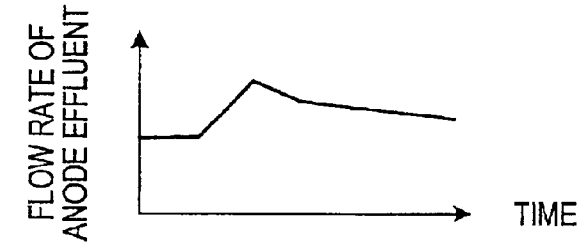

In order to retain the pressure of the reformate gas in a stable region (permitted pressure region) bounded by the upper limiting pressure and lower limiting pressure, the control shown in FIG. 4 is performed in this invention. This control is performed by the controller 100 shown in FIG. 2. As shown in the example in FIG. 4A, the fact that the temperature of the combustor 10 or the vaporizer 5 has fallen below a lower limiting temperature is detected by the temperature sensor 21 or the temperature sensor 22 shown in FIG. 1. In this case, the flow rate of anode effluent as shown in FIG. 4B is increased by suppressing the power generation amount in the fuel cell stack 8 shown in FIG. 1.

Figure 4C:
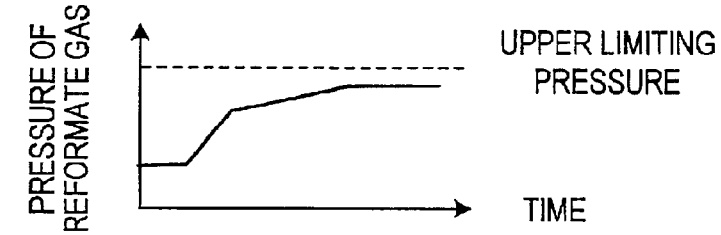

However as shown in FIG. 4C, the rate of increase in the flow rate of the anode effluent is suppressed by the controller 100 to a magnitude at which the pressure of the reformate gas does not exceed the upper limit and which is smaller than the rate of increase shown in FIG. 3C. In this manner, damage to the reformer 6 and damage to the fuel cell stack 8 shown in FIG. 1 can be avoided by returning the temperature in a relatively gentle manner to the lower limiting temperature as shown in FIG. 4A.

When the aperture of the pressure regulation valve 20 shown in FIG. 1 is increased to regulate the flow rate of anode effluent, the rate of change in the aperture is controlled and the rate of decrease with respect to time of the pressure of the reformate gas is controlled. As a result, the pressure does not fall below the lower limiting pressure.

In the description above, the flow rate of anode effluent is varied in order to increase the temperature of the combustor 10 or the vaporizer 5 when it falls below the lower limiting temperature. However when it is necessary to make the flow rate of anode effluent undergo a large transient fluctuation even when the temperature is not below the lower limiting temperature, the control shown in FIG. 4 is effective. For example, this control focuses on preventing the temperature from falling below a lower limiting temperature by increasing the flow rate of anode effluent in advance in order to cope with an increase in the power generation amount required by the fuel cell stack 8 in FIG. 1.

From the description above, the importance of varying the flow rate of anode effluent in a gentle manner as shown in FIG. 4 can be understood.

Since the upper limiting pressure of the reformate gas depends on the withstanding pressure of the fuel cell stack 8, it differs depending on the design or type of fuel cell stack. The lower limiting pressure also differs depending on the design or type of fuel cell stack. For example, the upper limiting pressure is set to 150 kPa and the lower limiting pressure is set to 50 kPa.

Figure 5:
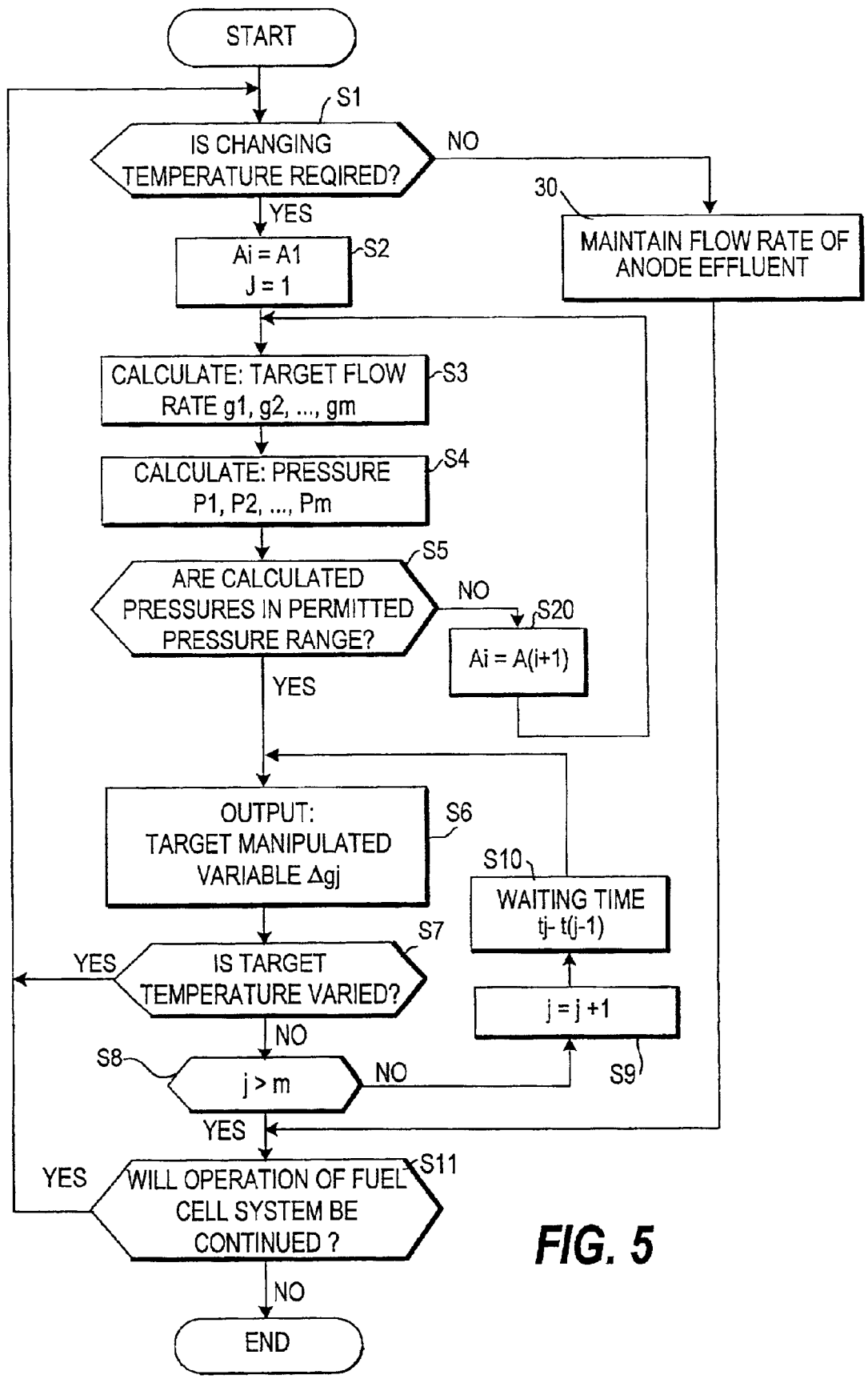
FIG. 5 is a flowchart describing an example of a control routine performed by a controller according to this invention.
Figure 6:
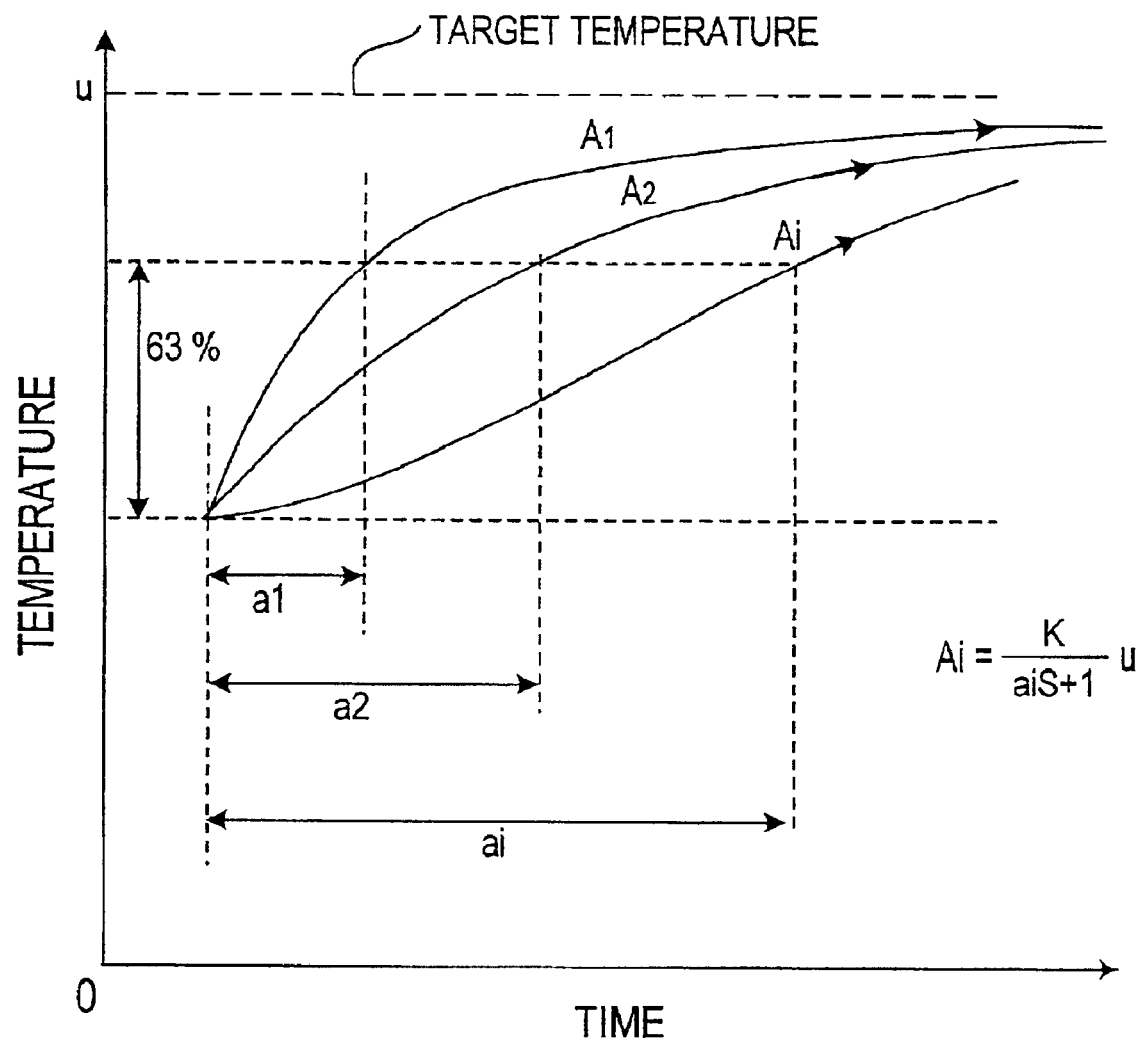
FIG. 6 is a schematic view of an example of a target temperature-time curve Ai determined on the basis of a time constant ai.

The controller 100 in this embodiment selects a target temperature-time curve (refer to FIG. 6). More precisely, it selects a target temperature variation over time from a set of temperature-time curves containing a number n of temperature-time curves. The set of temperature-time curves is stored in the ROM of the microcomputer 25 as a map or a set of functions. The target temperature-time curve (hereafter referred to as target curve) is such that the flow rate of anode effluent is varied without the pressure of the reformate gas diverging from a permitted pressure range. That is to say, according to the target temperature-time curve, while the temperature undergoes variation over time, the pressure of the reformate gas does not deviate from the permitted pressure range. FIG. 5 is an example of a flowchart showing a control routine for selecting the temperature-time curve.

FIG. 5 is a flowchart showing a control routine for the controller 100. FIG. 6 is a schematic figure of a set of temperature-time curves (one of the set is selected by the control routine shown in FIG. 5). The set of temperature-time curves shown as an example expresses a first order response delay. However this invention is not limited in this respect. When the target temperature of the combustor 10 or the vaporizer 5 is taken to be "u", the temperature-time curve for the combustor 10 or the vaporizer 5 reaching the target temperature u can be expressed as a Laplace transformation by Equation (1) below.

$$Ai = Ku/(a_i S + 1) \quad (1)$$

Here "$a_i$" is the time constant expressing the time required for the temperature to reach a fixed ratio (63%) of the target value, "S" is the Laplace operator and "K" is an arbitrary constant. "i" is an arbitrary natural number. As shown in FIG. 6, variation in the temperature becomes gentle as the time constant ai increases and consequently the required time for the temperature to reach a target value of u increases. When the selection of the target temperature-time curve is such that the present temperature is taken to be "0%" and the final temperature is "100%", the temperature at a certain moment can be set to a certain %. Consequently the amount of variation (manipulated variable) per unit time of the flow rate of the anode effluent is regulated based on the above setting.

The outline of the control routine shown in FIG. 5 will be described hereafter. Small values are selected in order from a pre-set plurality of time constants $a_1$–$a_n$ (where n is a natural number). It is assumed that the temperature varies according to a temperature-time curve Ai corresponding to the selected time constant $a_i$. Then, it is predicted whether or not the pressure of the reformate gas will deviate from a permitted pressure range when the flow rate of anode effluent is varied according to the curve. Thus it is possible to know whether or not the selected temperature curve Ai is suitable. The time constants $a_1$–$a_n$ are arranged in order of increasing magnitude.

In a step S1, a temperature variation determination unit 25a provided in the microcomputer 25 shown in FIG. 2 determines whether or not the temperature of the combustor 10 or the vaporizer 5 must be varied. The determination is performed by comparing the measured value for the temperature from the temperature sensor 21 or the temperature sensor 22 with a limiting temperature such as the upper limiting temperature or the lower limiting temperature defining the permitted temperature range of the combustor 10 or the vaporizer 5. Instead of limiting temperatures, the determination can be performed using a target temperature for the combustor 10 or the vaporizer 5.

The upper limiting temperature of the vaporizer is the temperature above which the function of the vaporizer is adversely affected by thermal stress resulting from a difference in the temperature of the liquid fuel and the temperature of the material comprising the vaporizer. The lower limiting temperature of the vaporizer is the temperature below which the vaporizing performance of the vaporizer 5 is adversely affected and below which it is not possible to vaporize an amount of fuel corresponding to the required value for power generation. The upper limiting temperature and lower limiting temperature of the vaporizer depend on the design characteristics of the vaporizer. For example, when using methanol as a fuel, the upper limiting temperature of the vaporizer is 120 degrees C. and the lower limiting temperature of the vaporizer 80 degrees C.

The upper limiting temperature and lower limiting temperature of the combustor also depends on design characteristics and is determined so that the temperature of the vaporizer is maintained between the upper and lower limiting temperatures of the vaporizer. For example, the upper limiting temperature of the combustor is set to 310 degrees C. and the lower limiting temperature of the combustor is set to 280 degrees C.

For example, when the lower limiting temperature is compared with the measured temperature and it is determined that the measured temperature is lower than the lower limiting temperature, it is determined in a step S1 that it is necessary to vary the temperature. In this case, it is necessary to return the temperature to a value greater than or equal to the lower limiting temperature. When the result is "YES" in the step S1, the routine proceeds to a step S2. When it is not necessary to vary the temperature in the step S1, the routine proceeds to a step S30. In the step S30, the flow rate of anode effluent is maintained in its present state and thereafter the routine proceeds to a step S11. In the step S11, it is determined whether or not the operation of the fuel cell system is continued. When it is negative, the routine is terminated. When it is affirmative, the routine returns to the step S1.

In the step S2, the target temperature for the combustor 10 or the vaporizer 5 (for example, this is stored in the RAM of the microprocessor 25 and is varied in response to the power generation amount required by the fuel cell stack 8) is read. As an initial setting, the target curve A1 is selected by the temperature curve selection unit 25b shown in FIG. 2 as a target curve. That is to say, the index i of the target curve is set to "1". The initial value of the variable j described below is set to "1" by the anode effluent flow rate control unit 25f.

Next in a step S3, a target flow rate for the anode effluent which varies the temperature of the combustor 10 or the vaporizer 5 with respect to the target curve Ai is calculated by the anode effluent flow rate calculation unit 25c shown in FIG. 2. The target flow rate calculated at this time comprises a number m of flow rates connected in a time series defined as g1, g2, . . . , gm.

Next in a step S4, the reformate gas pressure prediction unit 25d calculates the pressure P1, P2, . . . , Pm of the reformate gas at a time t1, t2, ..., tm using the target flow rates of a time series g1, g2, ..., gm calculated in the step S3 in order to predict the variation in the pressure of the reformate gas. More precisely, a variable amount for the pressure $\Delta P1, \Delta P2, ..., \Delta Pm$ is predicted resulting from the target flow rate g1, g2, ..., gm which varies in order. Here, $\Delta Pj=P(j+1)-Pj$. The pressure of the reformate gas is predicted in the form of the time series by sequentially adding the variable amount for the pressures of a time series $\Delta P1, \Delta P2, ... \Delta Pm$ to the present measured value for the pressure of the reformate gas detected by the pressure sensor 18 shown in FIG. 1. In this manner, the prediction profile of the pressure is calculated. It is possible to predict the pressure using a stored map or a calculation formula based on experimental data related to the operating state of the fuel cell system. In preparatory experiments to obtain the experimental data, the aperture of the pressure control valve 20 and the generated power amount of the fuel cell stack 8 shown in FIG. 1 are taken into account.

Next in a step S5, the pressure determination unit 25e shown in FIG. 2 determines whether or not the predicted pressure P1, P2 ..., Pm of the reformate gas contains a value which deviates from the permitted pressure range. That is to say, in the step S5, it is determined whether or not the predicted pressure for the reformate gas is bounded by the permitted pressure range. When it is determined that the predicted pressure deviates from the permitted pressure range, since the presently selected curve Ai which applies the target flow rates g1, g2, ..., gm is unsuitable, the routine proceeds to a step S20.

Next in the step S20, the target curve selection unit 25b selects a subsequent target curve A(i+1) as a target curve on the basis of the determination from the reformate gas pressure determination unit 25e that the previous curve is unsuitable. The newly selected target curve A(i+1) is checked by the process in the steps S3–S5. The process in the steps S3–S5 is repeated until a suitable target curve Ai is selected. A final single target curve Ai is selected by a determination of "YES" in the step S5. Of the plurality of target curves which maintain the pressure of the reformate gas to the permitted pressure range, the finally selected target curve Ai is the target curve which enables the temperature of the combustor 10 or the vaporizer 5 to reach the target temperature most rapidly.

In the step S5, when it is determined that the predicted pressure is bounded by the permitted pressure range (YES), the routine shifts to loop control. In loop control, the process in the step S6 to S8 is repeated on the natural number variable j=1~m. The constant m which is an arbitrary natural number expresses the number of times the flow rate of anode effluent is varied. The variable j has already been described with reference to the step S2 and expresses the order of variation in the flow rate of the anode effluent.

Loop control will be described below. In a step S6, a target manipulated variable $\Delta gj$ at a time tj is calculated and is outputted to power control circuit 27 and the reformate gas pressure control circuit 28. That is to say, a target manipulated variable $\Delta gj$ at a time tj is calculated by the anode effluent flow rate control unit 25f in FIG. 2 on each occasion loop control is repeated based on the flow rate g1, g2, ..., gm calculated in the step S4. Here, $\Delta gj=[g(j+1)-gj]/[t(j+1)-tj]$. Thus, the target manipulated variables $\Delta g1, \Delta g2, ..., \Delta gm$ at a time t1, t2, ..., tm are calculated. The anode effluent flow rate control unit 25f in FIG. 2 performs a process to vary the flow rate of anode effluent at a time tj based on the calculated target manipulated variable $\Delta gj$. In this manner, the flow rate of anode effluent is successively updated by repeating the process in the step S6 on each loop. In a step S8, it is determined whether or not the variable j is greater than m. In the step S8, when the determination is negative, the value j is updated to j+1 in a step S9. Furthermore in a step S10, the routine waits for a time interval $[tj-t(j-1)]$ in order to regulate the subsequent timing at which the flow rate of anode effluent is updated.

A step S7 is inserted into the loop control. In the step S7, it is determined whether or not the target temperature is varied in the step S7. When it is determined that the target temperature is varied in the step S7, the routine terminates loop control and proceeds to a step S1. As a result, when the target temperature is varied in the period from the starting time to termination time of control for the presently selected target curve Ai, a new temperature curve is set. For example, when the power generation amount required by the fuel cell stack 8 is varied, the target temperature is varied. As long as it is not determined that the target temperature is varied in a step S7, the processes in the steps S6 to S10 are repeated according to the presently selected target curve Ai. On the other hand, when it is determined that the target temperature is varied (YES), the routine returns to the step S1.

When the variable j is greater than m and the termination condition (j>m) is satisfied in a step S8, the routine proceeds to the step S11 where it is determined whether or not the operation of the fuel cell system will be continued. When it is determined that the operation will be continued, the routine repeats steps after the step S1. On the other hand, when it is determined that the operation will be terminated, the routine is terminated.

Except for varying the target temperature at a point between the starting point and end point of the target temperature curve, the loop control described above allows the flow rate of anode effluent to be varied using the entire target curve from the starting point to the end point.

Furthermore in the step S6, the flow rate of air (oxygen) used in the combustion of the anode effluent is varied by the total air flow rate control circuit 26 and the air pressure control circuit 29, in response to the variation in the flow rate of the anode effluent.

In the step S6, the flow rate of the anode effluent is varied by the power control circuit 27 which increases or decreases the power generation amount of the fuel cell stack 8 according to a command from the anode effluent flow rate control unit 25f. More precisely, when it is necessary for the flow rate of anode effluent to be increased, the power generation amount is decreased and conversely, when it is necessary for the flow rate to be decreased, the power generation amount is increased.

It is preferred that in addition to varying the power generation amount, the anode effluent flow rate is varied by varying the aperture of the pressure control valve 20 in FIG. 1 with the reformate gas pressure control circuit 28. For example, when the flow rate of anode effluent is required to be increased, the power generation amount of the fuel cell stack 8 is decreased, and the aperture of the pressure control valve 20 is increased.

A decrease in the power generation amount causes the pressure of the reformate gas to increase. An increase in the aperture of the pressure control valve 20 causes the pressure of the reformate gas to decrease. Thus, performing independent control of the power generation amount and the aperture simultaneously enables the flow rate of anode effluent to be controlled rapidly. Consequently it is possible to perform rapid variation of the pressure of the reformate gas.

The relationship between the aperture and the flow rate of anode effluent and the relationship between the power generation amount and the flow rate of anode effluent are set by a suitable method. For example, several preferred combinations of the aperture and the power generation amount can be provided on the basis of experimental results and the optimal combination can be selected in response to the operating state of the fuel cell system. Furthermore the equation used for the aperture and the power generation amount can be determined on the basis of experiment or simulation and an optimal value can be obtained in response to the operating conditions. Alternately, when the pressure of the reformate gas deviates from the permitted pressure range at a power generation amount which realizes the selected target curve Ai, regulating the aperture of the pressure control valve 20 puts the pressure back within the permitted pressure range. Furthermore, either the aperture or the power generation amount may be set as a main parameter while the other parameter is used for supplemental regulation.

In the control routine shown in FIG. 5, a target curve which determines control at a "plurality" of time periods is set in a step S2 or a step S20. Thereafter the target flow rate of anode effluent is calculated as a time series at the "plurality" of time periods in a step S3. The variation in the pressure of the reformate gas is predicted at the "plurality" of time periods in a step S4 in order to predict the pressure value. However the method of restricting the pressure used in this invention to a permitted pressure range is not limited to calculating a predicted value for the pressure on a plurality of occasions and then controlling the flow rate of anode effluent on that basis.

Without setting a target temperature-time curve and the target flow rate of a time-series, only one target flow rate on a single occasion may be set, and the pressure may be predicted immediately before the flow rate is changed to that target flow rate. In this case, it is determined whether or not the predicted pressure is within the permitted pressure range. When it is determined that the pressure will deviate from the permitted pressure range, a new target flow rate is set. The determination process can be repeated in order to determine whether or not the provisionally set target flow rate is suitable. The variation over time in the flow rate of the target anode effluent allowing the pressure of the reformate gas to be restricted to the permitted pressure range can then be calculated in this manner.

As shown above, the time constant ai is used to select one target curve for temperature as shown in FIG. 6. A manipulated variable per unit time for the flow rate of anode effluent is determined in response to the target curve and the pressure of the reformate gas can be restricted at all times to the permitted pressure range.

Figure 7:
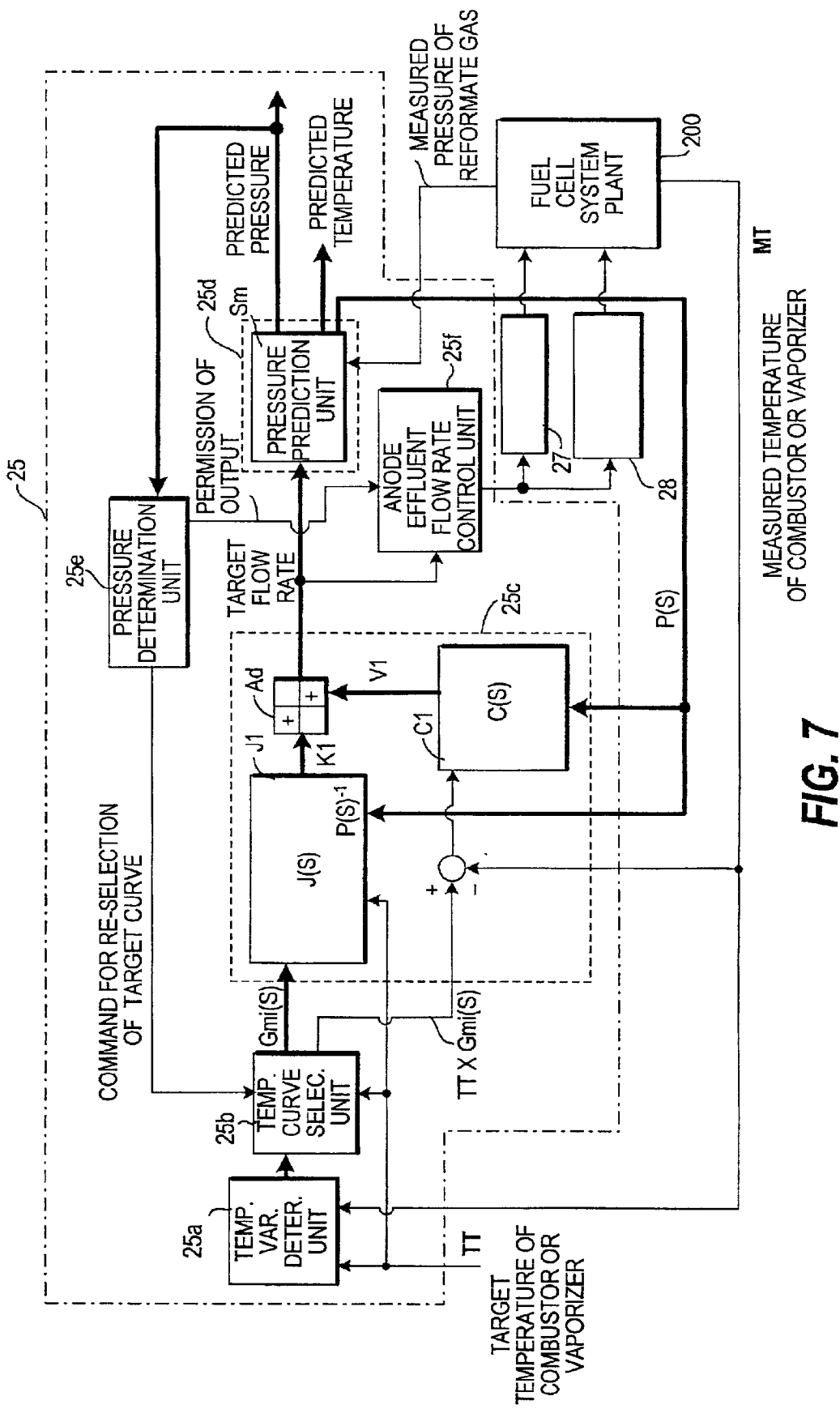
FIG. 7 is a block diagram describing the control routine shown in FIG. 5.

FIG. 7 is a more precise control block diagram showing the structure of a microcomputer 25 performing the above control routine. Those components in FIG. 7 which are the same as those described above with respect to FIG. 2 are denoted by the same reference numerals and additional description will be omitted.

The target temperature for the vaporizer 5 or the combustor 10 is inputted into the target curve selection unit 25$b$. When the target temperature is inputted, the target curve selection unit 25$b$ selects a target curve which optimizes rapid variation of the temperature of the vaporizer 5 or the combustor 10. Although the combustor 10 is used as an example below in order to simplify the description, it is possible to adapt the calculation applied to the combustor to the vaporizer 5 as well.

The target curve setting unit 25$b$ outputs a transfer function Gmi(S) to the subunit J1. The transfer function Gmi(S) is a matrix expressing the selected target temperature-time curve Ai. The product of the target temperature TT of the combustor 10 and the transfer function Gmi(S) is outputted to the subunit C1. In the preferred embodiments, the transfer function Gmi(S) is obtained based on a known system identification theory.

The result of subtracting the measured temperature MT of the combustor 10 from the multiple of the target temperature TT and the transfer function Gmi(S) is inputted to the subunit C1. The subunit C1 calculates a flow rate V1 of the anode effluent based on Equation (2) from the subtraction result.

$$V1 = C(S) \times (TT \times Gmi \times (S) - MT) \tag{2}$$

Where C(S) is control gain of subunit C1.

The control gain C(S) is given from Equation (3).

$$C(S) = Q(S) \times (I - P(S) \times Q(S))^{-1} \tag{3}$$

The transfer function P(S) expresses how the temperature of the combustor 10 varies in response to variation in the flow rate of the anode effluent. The regulation parameter Q(S) is an arbitrary transfer function or constant. "I" is a unit matrix. The regulation parameter Q(S) which is an arbitrary transfer function or constant is set so that $(I - P(S) \times Q(S)) = 0$ when S=0. The transfer function P(S) is pre-determined by a step response experiment.

When the calculated flow rate V1 itself is used as the target flow rate for the anode effluent, fluctuation of temperature is generated in the resultant temperature-time curve. As a result, the resultant temperature-time curve does not completely coincide with the target temperature-time curve. A matrix which cancels out this fluctuation of temperature is calculated in the subunit J1 in order to avoid instability in the temperature. Equation (4) which calculates the correction K1 on the flow rate of anode effluent is shown below.

$$K1 = J(S) \times TT \tag{4}$$

The correction K1 is determined by the target temperature TT of the combustor 10 and the gain J(S) of the subunit J1. The gain J(S) as shown in Equation (5) can be determined from the matrix G(S) expressing the inverse matrix $P^{-1}(S)$ of the transfer function P(S) and the transfer function Gmi(S) which expresses the target curve.

$$J(S) = G(S) \times Gmi(S) \tag{5}$$

However when the calculation is performed using the Equation (5) which has a high calculation load, the load on the CPU of the microcomputer 25 is increased.

Therefore, it is preferred that a plurality of representative target curves Gmi(S) are selected in advance, and a plurality of representative gain values J(S) are prepared by the calculation which is performed in advance using these target curves. During actual control, a single optimal curve is selected from the plurality of prepared target curves Gmi(S) and a corresponding gain J(S) is selected. As a result, the calculation step of the gain J(S) can be omitted. Thereafter the correction K1 is calculated using the selected gain J(S).

Of course, when the calculation load does not present a problem, the gain J(S) may be obtained by a calculation.

As shown above, the calculated correction K1 is added to the flow rate V1 of the anode effluent by an adder (Ad) in order to obtain the variation over time in the final target flow rate of the anode effluent. This target flow rate is inputted into a simulator (Sm) which simulates the behavior of the fuel cell system plant 200. The simulator corresponds to the reformate gas pressure prediction unit 25d in FIG. 2. The simulator simulates the behavior of the fuel cell system plant 200, based on the inputted target flow rate and a measured value for the pressure of the reformate gas obtained from the fuel cell system plant 200. As a result the simulator predicts the variation in the pressure of the reformate gas.

The predicted pressure of the reformate gas obtained in the above manner is inputted into the reformate gas pressure determination unit 25e and it is determined whether or not the predicted pressure will deviate from the permitted pressure range. Furthermore the fuel cell system plant simulator calculates a transfer function P(S) in Equation (3) on the basis of the predicted operating conditions for the system plant 200. The function is outputted to the subunit C1 and the subunit J1.

When the reformate gas pressure determination unit 25e determines that the predicted pressure will deviate from the permitted pressure range, the target curve selection unit 25b is commanded to re-select a target temperature-time curve. In this manner, a target curve with more gentle variation is re-selected. When it is determined that the predicted pressure will be bounded by the permitted pressure range, the reformate gas pressure determination unit 25e applies an output permission to the anode effluent flow rate control unit 25f.

On receipt of the output permission, the anode effluent flow rate control unit 25f applies a command to the power control circuit 27 and the reformate gas pressure control circuit 28 so that a target anode effluent flow rate after corrected by the adder Ad is realized. The temperature of the combustor 10 undergoes accurate variation along the selected target curve Gmi by performing control based on the corrected flow rate. It is possible to vary the flow rate of anode effluent accurately in the intended manner using this accurate control. That is to say, when a target curve Gmi with gentle temperature variation is selected, the flow rate of the anode effluent also undergoes gentle variation.

Figure 8:
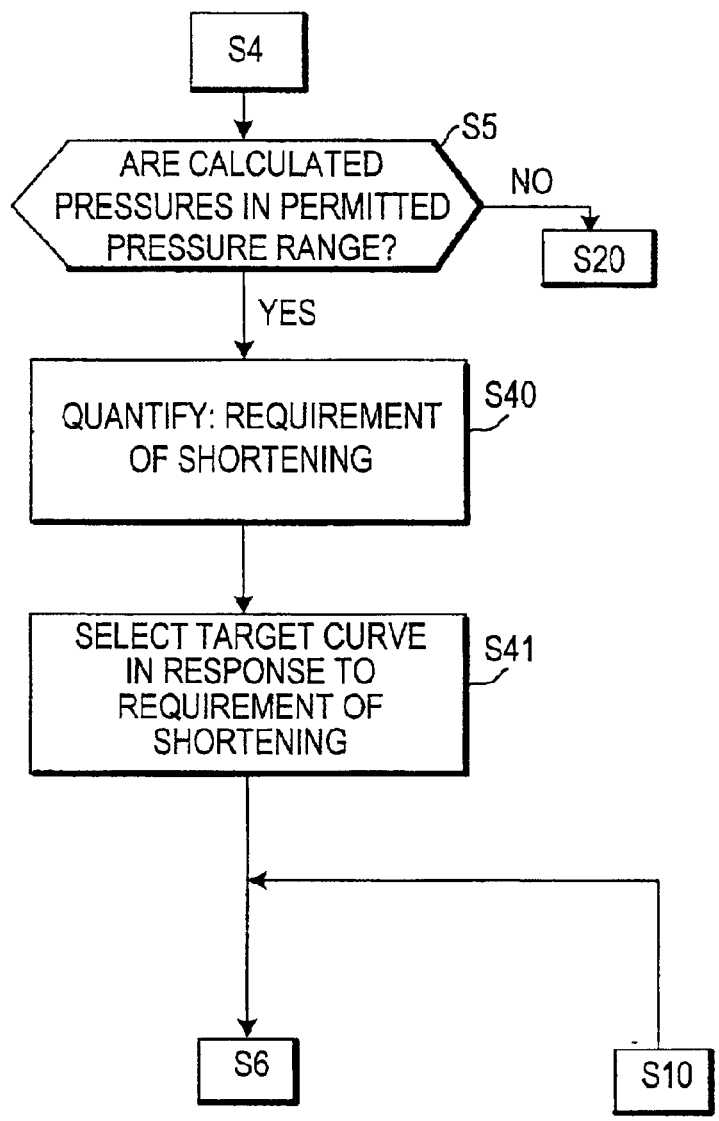
FIG. 8 is a flowchart describing another embodiment related to a control routine performed by a controller according to this invention.

Referring to FIG. 8, a second embodiment of the invention will be described below.

In the example shown in FIG. 5, the target curve Ai is sequentially updated to curves displaying more gentle variation until a determination becomes affirmative in a step S5. The target curve Ai is selected when the determination is affirmative. In this manner, the finally selected target curve Ai is a target curve at which the temperature of the combustor 10 or the vaporizer 5 reaches the target temperature most rapidly.

However it is not always necessary to maximize the speed at which the combustor 10 or the vaporizer 5 reaches the target temperature. The importance of reducing the time required to reach the target temperature depends on the operating load on a vehicle mounting the fuel cell system. Thus when it is not overly important to shorten the required time, a step may be added to select a desired curve from the curves Ai~An after the target curve Ai at which the determination is affirmative in a step S5. When it is not overly important to shorten the required time, a target curve may be selected in which the rate of change in the temperature is relatively low. In this manner, the variation amplitude in the pressure of the reformate gas can be suppressed and stable operation of the fuel cell system is ensured.

FIG. 8 is a flowchart describing an example of a control routine according to a second embodiment.

The control routine in FIG. 8 inserts new steps S40 and S41 between the steps S5 and S6 in the control routine shown in FIG. 5. FIG. 8 does not show equivalent components which are not particularly required for the purposes of description. The point of difference in the structure of the control routine from FIG. 5 will be described hereafter using FIG. 8.

The step S40 is performed after the determination of "YES" in the step S5. In the step S40, the requirement of shortening the required time is quantified. This requirement can be quantified for example based on the amount of depression of the accelerator pedal. The requirement of shortening the required time may be set to a value of "1" when the accelerator pedal is fully depressed, and may be set a value of "0" when the accelerator pedal is not depressed.

In the subsequent step S41, one target curve A(i+1) after the target curve Ai is selected in response to the value (degree of requirement) expressing the requirement calculated in the step S40. For example, when the accelerator pedal is fully depressed and it is required for the temperature of the vaporizer or the combustor 10 to reach the target temperature as rapidly as possible, the degree of requirement is set to "1" and the curve Ai is used without modification. In this manner, the temperature of the combustor 10 or the vaporizer 5 is varied in the shortest possible time and vehicle performance shifts rapidly to maximum performance. In contrast, when the accelerator pedal is moderately depressed, a target curve A(i+1) later in the sequence than the target curve Ai at which the determination of "YES" is made in the step S5 is selected.

In the two embodiments of a fuel cell system above, a target temperature-time curve of the vaporizer 5 or the combustor 10 which limits the predicted pressure to a permitted pressure range is selected in order to maintain the pressure of the reformate gas to the permitted pressure range. Control on the flow rate of the anode effluent is performed to realize the target curve. More precisely, a variable amount (manipulated variable) per unit time for the flow rate of the anode effluent is regulated by selecting a target curve for the temperature. This type of control avoids unintended increases in the pressure differential at the anode and the cathode of the fuel cell stack 8. Furthermore the pressure of the reformate gas is maintained to the respective permitted pressure ranges for the fuel cell 8 itself and the reformer 6. As a result, damage to the fuel cell stack 8 and the reformer 6 can be avoided and it is possible to prevent instability in the operation of the fuel cell system resulting from excessive variation in the pressure of the reformate gas.

The entire contents of Japanese Patent Application P2001-157037 (filed May 25, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel cell system comprising:
    a vaporizer for vaporizing liquid unreformed fuel in order to produce an unreformed fuel gas;
    a reformer which reforms the unreformed fuel gas in order to produce a reformate fuel gas;
    a fuel cell stack which generates power using the reformate fuel gas;
    a combustor which produces energy by combusting combustible components in a discharge gas supplied to the combustor from the fuel cell stack, the combustor applying energy for producing the unreformed fuel gas to the vaporizer; and a programmable controller which functions to:

control at least one of temperatures of the vaporizer and the combustor to their respective permitted temperature ranges, by varying the flow rate of the discharge gas to the combustor;

wherein the controller sets a target variation over time for the flow rate, predicts the pressure of the reformate fuel gas based on the target variation over time for the flow rate, and changes the target variation over time for the flow rate when the predicted pressure for the reformate fuel gas deviates from a permitted pressure range.

2. The fuel cell system as defined in claim 1, wherein the controller suppresses the target variation over time for the flow rate when the predicted pressure of the reformate fuel gas deviates from the permitted pressure range.

3. The fuel cell system as defined in claim 1, further comprising a sensor for detecting the reformate fuel gas pressure, wherein the controller predicts the pressure variation amount of the reformate fuel gas based on the target variation over time for the flow rate and predicts the pressure of the fuel gas from the sum of the predicted pressure variation amount and the detected reformate fuel gas pressure.

4. The fuel cell system as defined in claim 1, wherein the controller has the function of:

storing a set of temperature-time curves defining the characteristics of temperature variation over time;

selecting a single temperature-time curve from the set of temperature-time curves;

setting the target variation over time for the flow rate of the discharge gas which realizes the selected temperature-time curve;

calculating the pressure of the reformate fuel gas from the set target variation over time for the flow rate;

determining whether or not the predicted pressure is in the permitted pressure range; and re-selecting from the set of temperature-time curves another temperature-time curve with more gentle variation than the previously selected temperature-time curve, when the predicted pressure deviates from the permitted pressure range.

5. The fuel cell system as defined in claim 4, wherein the set of temperature-time curves respectively expresses a first-order response delay, and the time constant of the previously selected temperature-time curve is smaller than the time constant of the re-selected temperature-time curve.

6. The fuel cell system as defined in claim 1, further comprising a power conversion circuit for regulating the power generation amount of the fuel cell stack, wherein the controller controls the flow rate by varying the power generation amount of the fuel cell stack.

7. The fuel cell system as defined in claim 6 further comprising a valve which is provided between the fuel cell stack and the combustor, the valve controlling the flow rate with a valve aperture; wherein the controller controls the pressure of the reformate fuel gas by regulating the valve aperture.

8. The fuel cell system as defined in claim 1, wherein the fuel cell stack has an anode to which reformate fuel gas is applied and a cathode to which an oxidizing agent is applied.

9. The fuel cell system as defined in claim 4, wherein the controller selects a final temperature-time curve by taking into account a degree of a requirement for the temperature to rapidly reach a target temperature when the target variation over time for the flow rate is changed.

10. A fuel cell system comprising:

a vaporizer for vaporizing liquid unreformed fuel in order to produce an unreformed fuel gas;

a reformer which reforms the unreformed fuel gas in order to produce a reformate fuel gas;

a fuel cell stack which generates power using the reformate fuel gas;

a combustor which produces energy by combusting combustible components in a discharge gas supplied to the combustor from the fuel cell stack, the combustor applying energy for producing the unreformed fuel gas to the vaporizer; and a programmable controller which functions to:

control at least one of temperatures of the vaporizer and the combustor to their respective target temperatures, by varying the flow rate of the discharge gas to the combustor;

wherein the controller sets a target variation over time for the flow rate, predicts the pressure of the reformate fuel gas based on the target variation over time for the flow rate, and changes the target variation over time for the flow rate when the predicted pressure for the reformate fuel gas deviates from a permitted pressure range.

11. A temperature controlling method for a controller of a fuel cell system:

the fuel cell system comprising:

a vaporizer for vaporizing liquid unreformed fuel in order to produce an unreformed fuel gas;

a reformer which reforms the unreformed fuel gas in order to produce a reformate fuel gas;

a fuel cell stack which generates power using the reformate fuel gas; and a combustor which produces energy by combusting combustible components in a discharge gas supplied to the combustor from the fuel cell stack, the combustor applying energy for producing the unreformed fuel gas to the vaporizer;

the temperature controlling method comprising:

setting a target variation over time for the flow rate;

predicting the pressure of the reformate fuel gas based on the target variation over time for the flow rate;

changing the target variation over time for the flow rate when the predicted pressure for the reformate fuel gas deviates from a permitted pressure range; and controlling at least one of temperatures of the vaporizer and the combustor to their respective permitted temperature ranges, by varying the flow rate of the discharge gas to the combustor.

* * * * *